(12) United States Patent
Ou (10) Patent No.: US 9,779,406 B2
(45) Date of Patent: Oct. 3, 2017

(54) USER FEATURE IDENTIFICATION METHOD AND APPARATUS

(71) Applicant: Alibaba Group Holding Limited, Grand Cayman (KY)

(72) Inventor: Zhou Ou, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 439 days.

(21) Appl. No.: 14/515,885

(22) Filed: Oct. 16, 2014

(65) Prior Publication Data

US 2015/0112920 A1  Apr. 23, 2015

(30) Foreign Application Priority Data

Oct. 17, 2013 (CN) .......................... 2013 1 0487917

(51) Int. Cl.
*G06N 99/00* (2010.01)
*G06Q 30/00* (2012.01)
(Continued)

(52) U.S. Cl.
CPC ............. *G06Q 30/00* (2013.01); *G06F 21/00* (2013.01); *G06N 99/00* (2013.01); *G06Q 30/0282* (2013.01); *G06Q 30/0609* (2013.01)

(58) Field of Classification Search
CPC ..................................................... G06N 99/00
See application file for complete search history.

(56) References Cited

U.S. PATENT DOCUMENTS

| 8,620,822 B2 | 12/2013 | Wiseman et al. |
| 8,725,597 B2 | 5/2014 | Mauseth et al. |

(Continued)

OTHER PUBLICATIONS

J.B. Schafer et al., "E-Commerce Recommendation Applications", Data Mining and Know. Discovery, 2001, pp. 115-153.*

(Continued)

*Primary Examiner* — Vincent Gonzales
(74) *Attorney, Agent, or Firm* — Lee & Hayes, PLLC (57) ABSTRACT

A method and an apparatus of identifying a user feature include: in response to receiving a designated evaluation of an interacting party in a service interaction, determining a reliability value of the designated evaluation of the interacting party based on a feature value of the service interaction; based on reliability values of multiple designated evaluations of the interacting party in multiple service interactions including the designated evaluation, determining a reliability mean value of the multiple designated evaluations; determining a reliability weighted mean value of the multiple designated evaluations based on a frequency weight corresponding to the multiple designated evaluations and the reliability mean value, wherein a number of the multiple designated evaluations is in a monotonically incremental or decremental relationship with the corresponding frequency weight; determining a user feature of the interacting party based on a size relationship between the reliability weighted mean value and a preset reliability threshold. Using the solution provided in the embodiment of the present disclosure can improve the accuracy of determining a user feature of an interacting party in a service interaction.

20 Claims, 4 Drawing Sheets

(51) Int. Cl.
    *G06F 21/00*    (2013.01)
    *G06Q 30/02*    (2012.01)
    *G06Q 30/06*    (2012.01)

(56) References Cited

U.S. PATENT DOCUMENTS

2008/0140576 A1   6/2008   Lewis et al.
2012/0246093 A1   9/2012   Stibel et al.
2012/0316991 A1   12/2012  Fallows
2013/0144800 A1   6/2013   Fallows

OTHER PUBLICATIONS

Z. Qu et al., "Determinants of online merchant rating: Content analysis of consumer comments about Yahoo merchants", Decision Support Sys. 46, 2008, pp. 440-449.*

* cited by examiner

USER FEATURE IDENTIFICATION METHOD AND APPARATUS

CROSS REFERENCE TO RELATED PATENT APPLICATION

This application claims foreign priority to Chinese Patent Application No. 201310487917.4 filed on Oct. 17, 2013, entitled "User Feature Identification Method and Apparatus", which is hereby incorporated by reference in its entirety.

TECHNICAL FIELD

The present disclosure relates to the field of Internet technologies, and in particular, relates to methods and apparatuses of identifying a user feature.

BACKGROUND

Along with the rapid development of Internet applications, real applications that perform service interactions via the Internet are becoming more popular. For example, in e-commerce, service interaction is equivalent to transaction associated with a commodity, and interacting parties of the service interaction are a providing party and a receiving party associated with the commodity, which may also be referred to as a seller and a buyer.

However, in existing environments network service interaction, especially on consumer to consumer (C2C) platforms, some service interaction providers may provide interaction content having a poor quality, which disagrees with the interaction content advertised by the providers to achieve the objective of deceiving receiving parties of the service interaction. Furthermore, the receiving parties do not have a better way to protect their rights after such service interactions are completed. For example, in e-commerce, a large number of small-scaled sellers with complicated sources of merchandise exist, and the difficulty of monitoring thereof is high. Some unscrupulous sellers may sell fake or shoddy goods to entrap buyers. If the goods have problems, the buyers find it difficult to protect their rights and cumbersome to provide evidence therefor, thus hurting the confidence of the buyers on online shopping and affecting the positive development of online transaction information industries.

Therefore, in order to effectively supervise network service interactions and restrict the providers from deceiving the receiving parties, after a service interaction is completed, a receiving party of the service interaction may evaluate a providing party. An evaluation result may be a positive evaluation such as a good comment, or a negative evaluation such as a bad comment. These evaluations may help receiving parties to discern providing parties, for example, identifying a seller providing fake goods.

Moreover, a service interaction platform may also perform identification for a user feature of a providing party based on evaluations given to the providing party in service interactions, such as determining whether the provider is providing interaction content with poor quality, and triggering a warning to facilitate manual intervention. Details thereof may include the following:

A method may include: for a providing party, counting the number of negative evaluations given to the providing party in service interactions, and when the number is greater than a preset number threshold, indicating that a user feature of the providing party is a negative feature, e.g., in e-commerce, which may further indicate that a seller is selling fake goods.

Another method may include: for a providing party, calculating a ratio of negative evaluations given to the providing party in service interactions with respect to all evaluations, and when the ratio is greater than a preset ratio threshold, indicating that a user feature of the providing party is a negative feature.

However, in real applications that perform service interactions based on the Internet, some receiving parties may give negative evaluations maliciously to providing party in the service interactions, and threaten the providing party thereby. In other words, some evaluations in the service interactions are not true and objective. Therefore, in the above solution, determining a user feature of a providing party merely based on the number of negative evaluations or the ratio of negative evaluations with respect to all evaluations of the providing party may be inaccurate.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

In view of the above, embodiments of the present disclosure provide a method and an apparatus of identifying a user feature, which are used to solve the problem associated with the inaccuracy of determining a user feature of an interacting party in a service interaction under existing technologies.

The embodiments of the present disclosure are implemented through the following technical solutions.

An embodiment of the present disclosure provides a method of identifying a user feature, which includes:

in response to receiving a designated evaluation of an interacting party in a service interaction, determining a reliability value of the designated evaluation of the interacting party based on a feature value of the service interaction;

based on reliability values of multiple designated evaluations of the interacting party in multiple service interactions including the designated evaluation, determining a reliability mean value of the multiple designated evaluations;

determining a reliability weighted mean value of the multiple designated evaluations based on a frequency weight corresponding to the multiple designated evaluations and the reliability mean value, wherein a number of the multiple designated evaluations is in a monotonically incremental or decremental relationship with the corresponding frequency weight;

determining a user feature of the interacting party based on a size relationship between the reliability weighted mean value and a preset reliability threshold.

Using the above method provided in the embodiment of the present disclosure, after a designated evaluation of an interacting party in a service interaction is received and when performing identification of a user feature of the interacting party is desired, a reliability mean value of multiple designated evaluations is determined based on reliability values of the multiple designated evaluations of the interacting party that include the designed evaluation. Furthermore, a reliability weighted mean value of the multiple designated evaluations is also determined with reference to a frequency weight corresponding to the multiple designated evaluations. Moreover, a number of the multiple designated evaluations is in a monotonically incremental or decremental relationship with the corresponding frequency weight. A reliability value of each designated evaluation indicates a degree of reliability of respective designated evaluation, and a reliability mean value of multiple designated evaluations can represent a total degree of reliability of the designated evaluations of the interacting party in a more comprehensive manner. Furthermore, reference is also made to an implication of the number of the multiple designated evaluations on the degree of reliability, so that the user feature of the interacting party can be determined more accurately based on the reliability weighted mean value.

Determining the reliability value of the designated evaluation of the interacting party based on the feature value of the service interaction, includes:

obtaining the reliability value of the designated evaluation of the interacting party by calculating a weighted sum of feature values of the service interaction in multiple dimensions and respective dimension weights corresponding to the multiple dimensions.

Determining the reliability mean value of the multiple designated evaluations based on the reliability value of the designated evaluation, includes:

setting an arithmetic mean value of the reliability values of the multiple designated evaluations to be the reliability mean value of the multiple designated evaluations;

obtaining the reliability mean value of the multiple designated evaluations by performing a weighted summation of the reliability values of the multiple designated evaluations and reliability weights corresponding to the multiple designated evaluations; or determining the reliability mean value of the multiple designated evaluations using the following formula:

$$\overline{X}_n = \overline{X}_{n-1} * \beta + X_n * (1-\beta);$$

wherein $\overline{X}_n$ is the reliability mean value of the multiple designated evaluations, $\overline{X}_{n-1}$ is a reliability mean value of designated evaluations in the multiple designated evaluations other than the designated evaluation, $X_n$ is the reliability value of the designated evaluation, $\beta$ is a constant greater than zero and less than one, and n is the number of the multiple designated evaluations.

Furthermore, the interacting party is a providing party, and the designated evaluation is a negative evaluation; the interacting party is the providing party, and the designated evaluation is a positive evaluation; or the interacting party is a receiving party, and the designated evaluation is the negative evaluation.

Furthermore, determining the user feature of the interacting party based on the size relationship between the reliability weighted mean value and the preset reliability threshold includes:

if the interacting party is the providing party and the designated evaluation is the negative evaluation, determining that the user feature of the interacting party is a negative feature and triggering a warning when the reliability weighted mean value is greater than the preset reliability threshold, wherein the number of the multiple designated evaluations is in the monotonically incremental relationship with the corresponding frequency weight; or if the interacting party is the providing party and the designated evaluation is the positive evaluation, determining that the user feature of the interacting party is a positive feature when the reliability weighted mean value is greater than the preset reliability threshold, wherein the number of the multiple designated evaluations is in the monotonically incremental relationship with the corresponding frequency weight; or if the interacting party is the receiving party and the designated evaluation is the negative evaluation, determining that the user feature of the interacting party is a fake feature and triggering a warning when the reliability weighted mean value is less than the preset reliability threshold, wherein the number of the multiple designated evaluations is in the monotonically decremental relationship with the corresponding frequency weight.

Furthermore, when the interacting party is the providing party and the designated evaluation is the negative evaluation, the designated evaluation for the interacting party is invisible/anonymous to the interacting party.

An embodiment of the present disclosure further provides an apparatus of identifying a user feature, which includes:

a reliability value determination unit, configured to determine a reliability value of a designated evaluation of an interacting party based on a feature value of a service interaction in response to receiving the designated evaluation of the interacting party in the service interaction;

a reliability mean value determination unit, configured to determine a reliability mean value of multiple designated evaluations of the interacting party in multiple service interactions that include the designated evaluation based on the reliability value of the designated evaluation;

a reliability weighted mean value determination unit, configured to determine a reliability weighted mean value of the multiple designated evaluations based on a frequency weight corresponding to the multiple designated evaluations and the reliability mean value, wherein a number of the multiple designated evaluations is in a monotonically incremental or decremental relationship with the corresponding frequency weight;

a feature determination unit, configured to determine a user feature of the interacting party according to a size relationship between the reliability weighted mean value and a preset reliability threshold.

Using the above apparatus provided in the embodiment of the present disclosure, after a designated evaluation of an interacting party in a service interaction is received and when performing identification of a user feature of the interacting party is desired, a reliability mean value of multiple designated evaluations is determined based on reliability values of the multiple designated evaluations of the interacting party that include the designed evaluation. Furthermore, a reliability weighted mean value of the multiple designated evaluations is also determined with reference to a frequency weight corresponding to the multiple designated evaluations. Moreover, a number of the multiple designated evaluations is in a monotonically incremental or decremental relationship with the corresponding frequency weight. A reliability value of each designated evaluation indicates a degree of reliability of respective designated evaluation, and a reliability mean value of multiple designated evaluations can represent a total degree of reliability of the designated evaluations of the interacting party in a more comprehensive manner. Moreover, reference is also made to an implication of the number of the multiple designated evaluations on the degree of reliability, so that the user feature of the interacting party can be determined more accurately based on the reliability weighted mean value.

The reliability value determination unit is further configured to obtain the reliability value of the designated evaluation of the interacting party by calculating a weighted sum of feature values of the service interaction in multiple dimensions and dimension weights corresponding to the multiple dimensions.

The reliability mean value determination unit is further configured to:

set an arithmetic mean value of the reliability values of the multiple designated evaluations to be the reliability mean value of the multiple designated evaluations;

obtain the reliability mean value of the multiple designated evaluations by performing a weighted summation of the reliability values of the multiple designated evaluations and reliability weights corresponding to the multiple designated evaluations; or determine the reliability mean value of the multiple designated evaluations using the following formula:

$$\overline{X}_n = \overline{X}_{n-1}*\beta + X_n*(1-\beta);$$

wherein $\overline{X}_n$ is the reliability mean value of the multiple designated evaluations, $\overline{X}_{n-1}$ is a reliability mean value of designated evaluations in the multiple designated evaluations other than the designated evaluation, $X_n$ is the reliability value of the designated evaluation, $\beta$ is a constant greater than zero and less than one, and n is the number of the multiple designated evaluations.

The feature determination unit is further configured to:

if the interacting party is a providing party and the designated evaluation is a negative evaluation, determine that the user feature of the interacting party is a negative feature and trigger a warning when the reliability weighted mean value is greater than the preset reliability threshold, wherein the number of the multiple designated evaluations is in the monotonically incremental relationship with the corresponding frequency weight; or if the interacting party is the providing party and the designated evaluation is a positive evaluation, determine that the user feature of the interacting party is a positive feature when the reliability weighted mean value is greater than the preset reliability threshold, wherein the number of the multiple designated evaluations is in the monotonically incremental relationship with the corresponding frequency weight; or if the interacting party is a receiving party and the designated evaluation is the negative evaluation, determine that the user feature of the interacting party is a fake feature and trigger a warning when the reliability weighted mean value is less than the preset reliability threshold, wherein the number of the multiple designated evaluations is in the monotonically decremental relationship with the corresponding frequency weight.

Other characteristics and advantages of the present disclosure will be described hereinafter, and will become partially obvious from the specification or be understood by way of implementing the present disclosure. The objectives and other advantages of the present disclosure may be achieved and obtained using a structure specifically indicated by the specification, claims and accompanying drawings.

BRIEF DESCRIPTION OF THE DRAWINGS

The accompanying drawings provide further understanding for the present disclosure, and constitute a part of the disclosure. The accompanying drawings are used to explain the present disclosure along with embodiments of the present disclosure, and are not intended to impose any limitations on the present disclosure. In the accompanying drawings.

DETAILED DESCRIPTION

In order to provide an implementation solution for improving the accuracy of determining a user feature of an interacting party in a service interaction, the embodiments of the present disclosure provide a method and an apparatus of identifying a user feature. The technical solution is applicable to a process of identifying a user feature of an interacting party after a service interaction is completed, and hence can be implemented as a method or an apparatus. Exemplary embodiments of the present disclosure are described herein in conjunction with the accompanying drawings of the disclosure. It should be understood that the exemplary embodiments described herein are merely used for illustrating and explaining the present disclosure, and are not intended to limit the present disclosure. Moreover, whenever a conflict does not exist, the embodiments in the present disclosure and features in the embodiments may be combined together.

Figure 1:
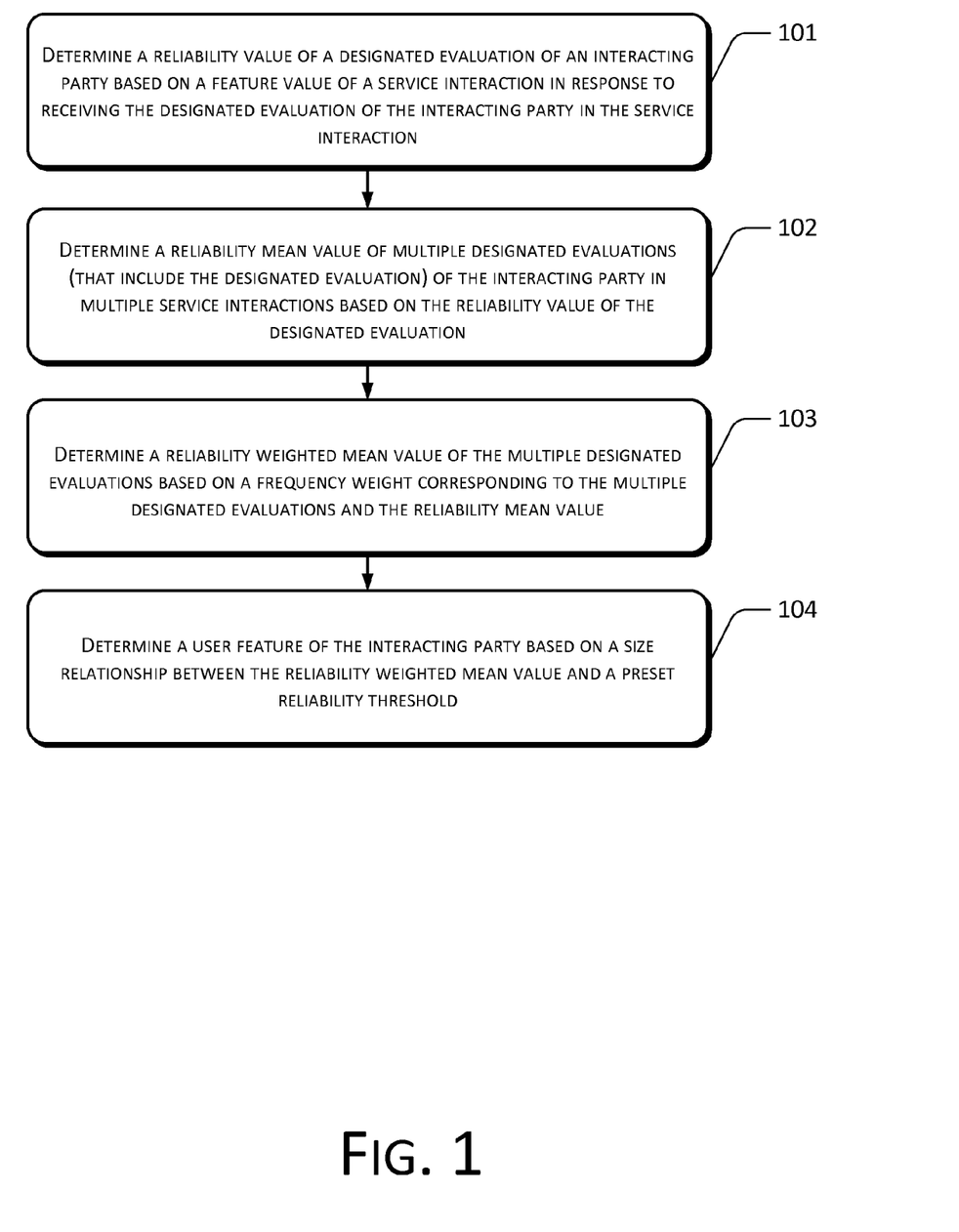
FIG. 1 is a flowchart of a user feature identification method according to an embodiment of the present disclosure.

An embodiment of the present disclosure provides a user feature identification method, as shown in FIG. 1, which includes:

Block 101 determines a reliability value of a designated evaluation of an interacting party based on a feature value of a service interaction in response to receiving the designated evaluation of the interacting party in the service interaction.

Block 102 determines a reliability mean value of multiple designated evaluations (that include the designated evaluation) of the interacting party in multiple service interactions based on the reliability value of the designated evaluation.

Block 103 determines a reliability weighted mean value of the multiple designated evaluations based on a frequency weight corresponding to the multiple designated evaluations and the reliability mean value, wherein a number of the multiple designated evaluations is in a monotonically incremental or decremental relationship with the corresponding frequency weight.

Block 104 determines a user feature of the interacting party based on a size relationship between the reliability weighted mean value and a preset reliability threshold.

In the user feature identification method, the interacting party may be a providing party in the service interaction such as a seller, or a receiving party in the service interaction such as a buyer. When the interacting party is a providing party, the designated evaluation may be a negative evaluation or a positive evaluation to determine whether a user feature of the providing party is a negative feature. When the interacting party is a receiving party, the designated evaluation may be a negative evaluation to determine whether a user feature of the receiving party is a fake feature.

In conjunction with the accompanying drawings, the method provided in the present disclosure is described in detail through a specific embodiment and using an example of identifying a user feature for a providing party in a service interaction based on a negative evaluation in the service interaction.

Figure 2:
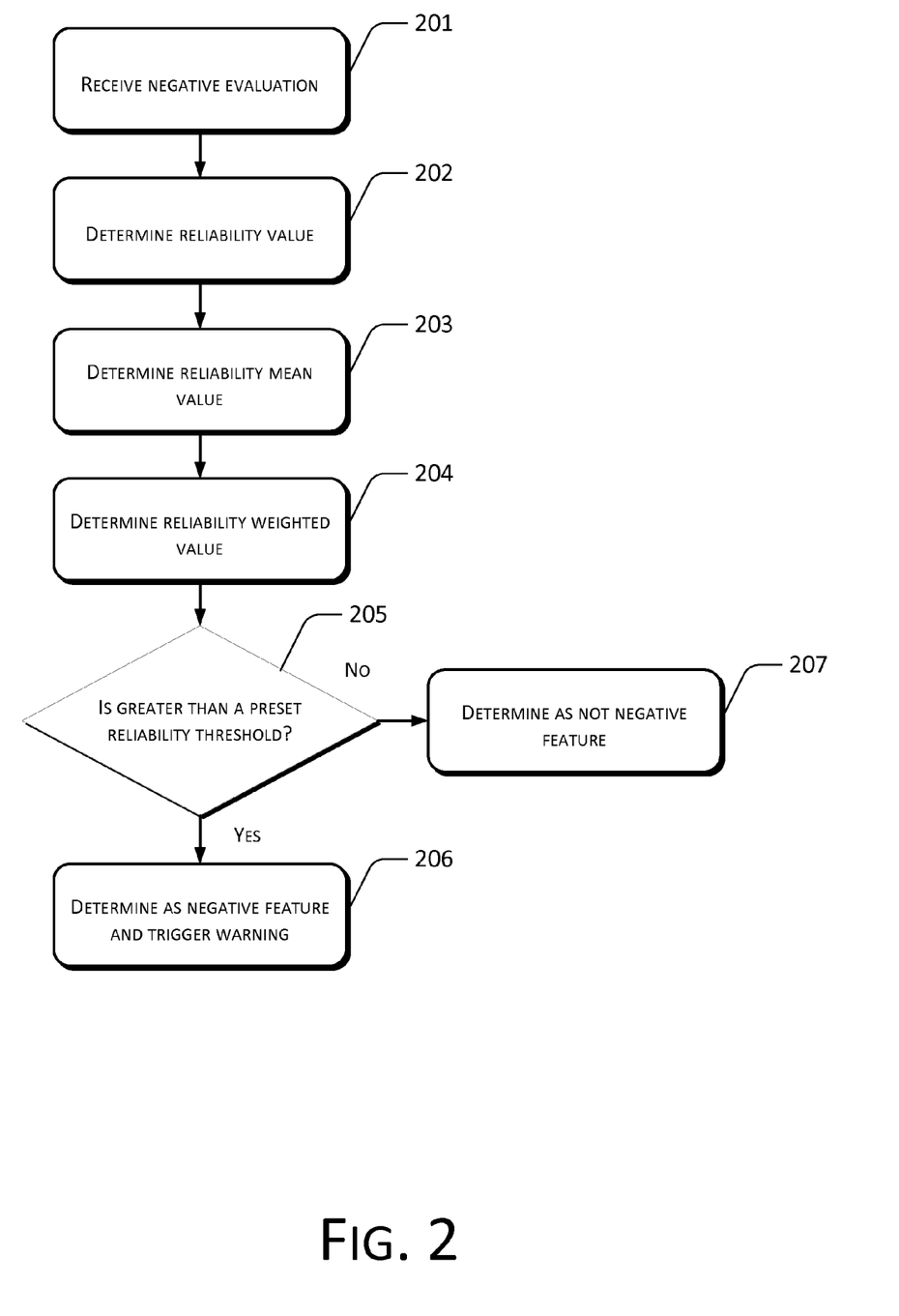
FIG. 2 is a flowchart of a user feature identification method according to a first embodiment of the present disclosure.

First Embodiment:

The first embodiment of the present disclosure provides a user feature identification method, as shown in FIG. 2, which includes the following processing blocks:

Block 201 receives a negative evaluation submitted by a receiving party regarding a providing party in an Internet-based service interaction after the service interaction is completed.

In a real Internet-based service interaction, when a receiving party submits a negative evaluation for a providing party, the receiving party is usually asked by the providing party to change the submitted negative evaluation, which harasses to the receiving party. To solve the problem, in the embodiment of the present disclosure, the negative evaluation submitted by the receiving party for the providing party may be invisible/anonymous to the providing party.

Specifically, after the service interaction is completed, evaluation options, which include a negative evaluation option and a positive evaluation option, may be provided to the receiving party in order for the receiving party to select and submit anonymously.

Block 202 determines a reliability value of the negative evaluation of the providing party based on a feature value of the service interaction, where the feature value of the service interaction indicates a characteristic condition of the service interaction.

In this block, the feature value of the service interaction that is used for determining the reliability value of the negative evaluation may include a feature value having multiple dimensions, and the multiple dimensions correspond to dimension weights respectively. Correspondingly, a weighted summation may be performed for the multi-dimensional feature value of the service interaction and the dimension weights corresponding to the multiple dimensions, so as to obtain the reliability value of the negative evaluation of the providing party.

For example, the multi-dimensional feature value may include:

a category risk feature value, i.e., a category risk feature value corresponding to a category to which service content exchanged in this service interaction belongs; since probabilities of occurrence of a negative evaluation are not the same when service content of different categories is involved, different categories correspond to different category risk feature values; for example, in e-commerce, service content is a transaction commodity, and probabilities of occurrence of a negative evaluation in categories of different transaction commodities are not the same, e.g., fake goods easily occurs during transactions of earphone-type goods, and fake goods do not easily occur during transactions of towel-type goods; thus, a category risk feature value corresponding to earphones may be higher than a category risk feature value corresponding to towels;

a credit rating of the receiving party, i.e., a credit rating of the receiving party in this service interaction, where an evaluation submitted by a receiving party having a higher credit rating has a higher reliability;

a registration time of the receiving party, i.e., a registration time of the receiving party in this service interaction, where an evaluation submitted by a receiving party having a longer registration time has a higher reliability, and an evaluation submitted by a newly registered receiving party has a lower reliability;

a historical volume service interaction of the receiving party, i.e., a historical volume of service interactions associated with the receiving party in this service interaction, where the higher the volume is, the higher the reliability of the evaluation submitted by the receiving party;

a historical volume of negative evaluations submitted by the receiving party, i.e., a number of negative evaluations submitted by the receiving party of this service interaction in the past, where the greater the number is, the lower the reliability of a negative evaluation submitted by the receiving party; and/or a credit rating of the providing party, i.e., a credit rating of the providing party in this service interaction, where a reliability of a negative evaluation that is provided for the providing party having a higher credit rating is lower.

In the embodiment of the present disclosure, feature values of other dimensions may also be adopted according to a real business condition, which are not described further herein through examples.

In this block 202, the respective dimension weights corresponding to the multiple dimensions may be set up flexibly according to real business conditions and requirements, and are not described further herein through examples.

In the embodiment of the present disclosure, stable reference information may be selected for the feature value of the service interaction on which determination of the reliability value of the negative evaluation is based. Examples include stable and one-time effective reference information, which includes the category risk feature value, the credit rating of the receiving party, the registration time of the receiving party, the historical service interaction volume of the receiving party, the historical volume of negative evaluations submitted by the receiving party, etc. Since these pieces of reference information that are related to the receiving party are in effect merely for this service interaction, these pieces of reference information may be used as the stable and one-time effective reference information. Another example includes stable and globally effective reference information, which includes the credit rating of the providing party, etc. Since identification of user feature is performed for a same providing party, these pieces of reference information related to the providing party is generally globally effective and is relatively stable, and therefore may be used as stable and globally effective reference information.

Because a reliability mean value of multiple negative evaluations (including this negative evaluation) of the providing party in multiple service interactions will be determined subsequently, the reliability value of this negative evaluation determined in this block will be used when determining a reliability mean value for a next negative evaluation. Therefore, in this block, stable reference information may be selected for the feature value of the service interaction when determining the reliability value of the negative evaluation, and upon determining, the reliability value may be stored, so that the reliability value may be directly acquired and used when needed later, without the need of acquiring relevant data from a basic database to perform summarization, thereby improving the processing efficiency, ensuring the timeliness of the method, avoiding the consumption of processing resources caused by repeated computation, and reducing the consumption of the processing resources.

Moreover, by using block 201 and block 202, each time after the service interaction is completed and the negative evaluation submitted for the providing party is received, identification of the user feature of the providing party is triggered dynamically, without the need of periodically scanning evaluation data in the basic database, thereby reducing the large occupancy of system processing resources that is caused by offline periodic data scanning calculation.

Block 203 determines a reliability mean value of multiple negative evaluations (including this negative evaluation) of the providing party in the multiple service interactions based on the reliability value of the negative evaluation of the providing party in the service interaction. The multiple service interactions may be service interactions performed between different receiving parties and a same providing party. Correspondingly, the multiple negative evaluations may be negative evaluations provided by different receiving parties with respect to a same providing party.

Further, the multiple negative evaluations in the multiple service interactions may be all negative evaluations associated with the providing party or all negative evaluations that are associated with the providing party since a certain historical time point.

In block 203, the reliability mean value of the multiple negative evaluations may be determined by using the following three methods:

The first method includes: acquiring stored reliability values of the multiple negative evaluations, and setting an arithmetic mean value of the reliability values of the multiple negative evaluations to be the reliability mean value of the multiple designated evaluations.

The second method includes: acquiring the stored reliability values of the multiple negative evaluations and respective reliability weights corresponding to the multiple negative evaluations, and performing weighted summation for the reliability values of the multiple negative evaluations and the respective reliability weights corresponding to the multiple negative evaluations to obtain the reliability mean value of the multiple designated evaluation, where the later the time that the negative evaluation is submitted is, the greater the reliability weight corresponding to the negative evaluation is.

The third method includes: determining the reliability mean value of the multiple negative evaluations using the following formula:

$$\overline{X}_n = \overline{X}_{n-1} * \beta + X_n * (1-\beta);$$

where $\overline{X}_n$ is the reliability mean value of the multiple negative evaluations, $\overline{X}_{n-1}$ is a reliability mean value of negative evaluations in the multiple negative evaluations other than this negative evaluation, $X_n$ is the reliability value of this negative evaluation, $\beta$ is a constant greater than zero and less than one and may be set flexibly according to actual needs, and n is the number of the multiple designated evaluations.

When the third method is used, each time the reliability mean value of the multiple negative evaluations is determined, the reliability mean value may be stored so that the reliability mean value may be directly acquired and used later when a reliability mean value of multiple negative evaluations is determined next time, thereby improving the processing efficiency.

Block 204 determines a reliability weighted mean value of the multiple negative evaluations based on a frequency weight corresponding to the multiple negative evaluations and the reliability mean value of the multiple negative evaluations, where the number of the multiple negative evaluations is in a monotonically incremental relationship with the corresponding frequency weight, e.g., the greater the number of the multiple negative evaluations is, the greater the frequency weight is.

For example, a frequency weight may be: $\alpha = 1 + k*n$;

where, $\alpha$ is the frequency weight corresponding to the multiple negative evaluations, n is the number of the multiple negative evaluations, i.e., the number of the currently accumulated negative evaluations, and k is a constant greater than zero and less than one and may be set flexibly according to actual needs, e.g., may be set to be 0.05.

Specifically, the reliability weighted mean value of the multiple negative evaluations may be a product of the frequency weight and the reliability mean value.

Block 205 determines whether the reliability weighted mean value is greater than a preset reliability threshold, and goes to block 206 if greater or goes to block 207 if not greater.

Block 206: When the reliability weighted mean value is greater than the preset reliability threshold, this indicates that the multiple negative evaluations given to the providing party in multiple service interactions in the past have a high degree of reliability. As such, the user feature of the providing party can be determined to be a negative feature. For example, in e-commerce, a negative feature indicates that the providing party is suspicious of selling fake goods. Furthermore, a warning may be triggered to allow subsequent manual intervention and processing.

Block 207: When the reliability weighted mean value is not greater than the preset reliability threshold, this indicates that the multiple negative evaluations given to the providing party in multiple service interactions in the past have a low degree of reliability. As such, the user feature of the providing party is determined to be not a negative feature. For example, in e-commerce, not being the negative feature indicates that the providing party is not suspicious of selling fake goods.

In the user feature identification method provided by the first embodiment of the present disclosure, a reliability value of each negative evaluation indicates a degree of reliability of that negative evaluation, and a reliability mean value of multiple negative evaluations indicates a total degree of reliability of the negative evaluations for a providing party in a more comprehensive manner. Moreover, reference is also made to an implication of the number of the multiple designated evaluations on the degree of reliability. As such, the user feature of the providing party can be determined more accurately according to a reliability weighted mean value.

Moreover, stable reference information may be selected for a feature value of a service interaction when determining a reliability value of a negative evaluation. Upon determining a reliability value of each negative evaluation, the reliability value may be stored so that the reliability value may be directly acquired and used when needed at a later time without the need of acquiring relevant data from a basic database for performing determination, thereby improving the processing efficiency, ensuring the timeliness of the method and reducing the consumption of the processing resources.

Moreover, after the service interaction is completed, the negative evaluation submitted by the receiving party for the providing party may be invisible/anonymous to the providing party, thereby preventing the receiving party from being frequently harassed by the providing party after submitting the negative evaluation.

In the method provided by the first embodiment of the present disclosure, descriptions are made through an example of performing user feature identification for a providing party in a service interaction based on a negative evaluation in the service interaction. In other embodiments, user feature identification may also be performed for a providing party in a service interaction based on a positive evaluation in the service interaction. In this case, the method shown in FIG. 2 may be used to determine a reliability weighted mean value, and when the reliability weighted mean value is greater than a preset reliability threshold, a user feature of the providing party is determined to be a positive feature. When the reliability weighted mean value is not greater than the preset reliability threshold, the user feature of the providing party is determined to be not a positive feature.

In other embodiments, user feature identification may further be performed for a receiving party in a service interaction based on a negative evaluation in the service interaction. In this case, the method shown in FIG. 2 may be used to determine a reliability weighted mean value. A difference lies in that a corresponding reliability weighted mean value is determined due to multiple negative evaluations submitted by the receiving party in multiple service interactions, and the number of the multiple negative evaluations is in a monotonically decremental relationship with a corresponding frequency weight. Correspondingly, when the reliability weighted mean value is less than the preset reliability threshold, a user feature of the receiving party is determined to be a fake feature, which means that the receiving party may be a user frequently submitting negative evaluations maliciously. Furthermore, a warning may be triggered. When the reliability weighted mean value is not less than the preset reliability threshold, the user feature of the receiving party is determined to be not a fake feature.

Figure 3:
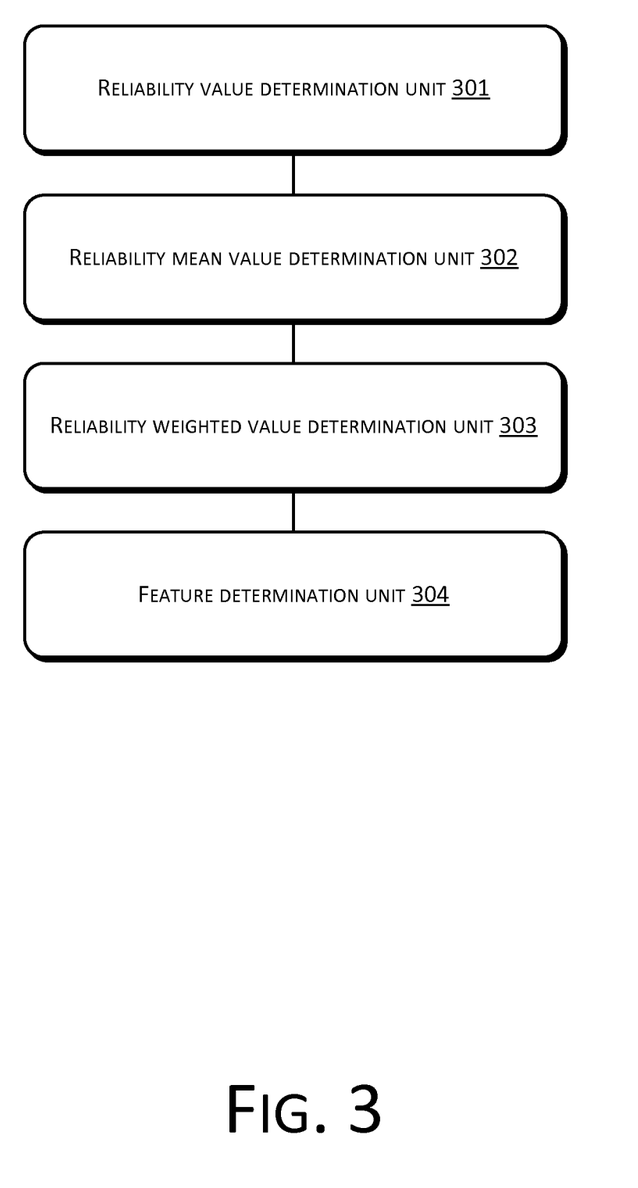
FIG. 3 is a structural diagram of a user feature identification apparatus according to a second embodiment of the present disclosure.

Second Embodiment:

According to another embodiment, a user feature identification apparatus is further provided correspondingly in the second embodiment of the present disclosure according to the user feature identification method provided in the above embodiment of the present disclosure. A structural diagram thereof, as shown in FIG. 3, includes:

a reliability value determination unit 301, configured to determine a reliability value of a designated evaluation of an interacting party based on a feature value of a service interaction in response to receiving the designated evaluation of the interacting party in the service interaction;

a reliability mean value determination unit 302, configured to determine a reliability mean value of multiple designated evaluations of the interacting party in multiple service interactions that include the designated evaluation based on the reliability value of the designated evaluation;

a reliability weighted mean value determination unit 303, configured to determine a reliability weighted mean value of the multiple designated evaluations based on a frequency weight corresponding to the multiple designated evaluations and the reliability mean value, wherein a number of the multiple designated evaluations is in a monotonically incremental or decremental relationship with the corresponding frequency weight;

a feature determination unit 304, configured to determine a user feature of the interacting party according to a size relationship between the reliability weighted mean value and a preset reliability threshold.

The reliability value determination unit 301 is further configured to obtain the reliability value of the designated evaluation of the interacting party by calculating a weighted sum of feature values of the service interaction in multiple dimensions and dimension weights corresponding to the multiple dimensions.

The reliability mean value determination unit 302 is further configured to:

set an arithmetic mean value of the reliability values of the multiple designated evaluations to be the reliability mean value of the multiple designated evaluations;

obtain the reliability mean value of the multiple designated evaluations by performing a weighted summation of the reliability values of the multiple designated evaluations and reliability weights corresponding to the multiple designated evaluations; or determine the reliability mean value of the multiple designated evaluations using the following formula:

$$\overline{X}_n = \overline{X}_{n-1} * \beta + X_n * (1-\beta);$$

wherein $\overline{X}_n$ is the reliability mean value of the multiple designated evaluations, $\overline{X}_{n-1}$ a reliability mean value of designated evaluations in the multiple designated evaluations other than the designated evaluation, $X_n$ is the reliability value of the designated evaluation, $\beta$ is a constant greater than zero and less than one, and n is the number of the multiple designated evaluations.

The feature determination unit 304 is further configured to:

if the interacting party is a providing party and the designated evaluation is a negative evaluation, and when the reliability weighted mean value is greater than the preset reliability threshold, determine that the user feature of the interacting party is a negative feature, and trigger a warning, wherein the number of the multiple designated evaluations is in the monotonically incremental relationship with the corresponding frequency weight; or if the interacting party is the providing party and the designated evaluation is a positive evaluation, and when the reliability weighted mean value is greater than the preset reliability threshold, determine that the user feature of the interacting party is a positive feature, wherein the number of the multiple designated evaluations is in the monotonically incremental relationship with the corresponding frequency weight; or if the interacting party is a receiving party and the designated evaluation is the negative evaluation, and when the reliability weighted mean value is less than the preset reliability threshold, determine that the user feature of the interacting party is a fake feature, and trigger a warning, wherein the number of the multiple designated evaluations is in the monotonically decremental relationship with the corresponding frequency weight.

The functions of the above units may correspond to respective processing blocks of the processes as shown in FIG. 1 and FIG. 2, and are not redundantly described herein.

In short, the solution provided in the embodiments of the present disclosure includes: in response to receiving a designated evaluation of an interacting party in a service interaction, determining a reliability value of the designated evaluation of the interacting party based on a feature value of the service interaction; based on reliability values of multiple designated evaluations of the interacting party in multiple service interactions including the designated evaluation, determining a reliability mean value of the multiple designated evaluations; determining a reliability weighted mean value of the multiple designated evaluations based on a frequency weight corresponding to the multiple designated evaluations and the reliability mean value, wherein a number of the multiple designated evaluations is in a monotonically incremental or decremental relationship with a corresponding frequency weight; determining a user feature of the interacting party based on a size relationship between the reliability weighted mean value and a preset reliability threshold. Using the solution provided in the embodiment of the present disclosure can improve the accuracy of determining a user feature of an interacting party in a service interaction.

The user feature identification apparatus provided in the embodiment of the present invention may be implemented through a computer program. Those skilled in the art should understand that the division manner of the modules is merely one of multiple module division manners, and if the apparatus is divided into other modules or is not divided into modules, as long as the user feature identification apparatus has the above functions, it should fall within the scope of the present invention.

The present disclosure is described in accordance with flowcharts and/or block diagrams of the exemplary methods, apparatuses (systems) and computer program products. It should be understood that each process and/or block and combinations of the processes and/or blocks of the flowcharts and/or the block diagrams may be implemented in the form of computer program instructions. Such computer program instructions may be provided to a general purpose computer, a special purpose computer, an embedded processor or another processing apparatus having a programmable data processing device to generate a machine, so that an apparatus having the functions indicated in one or more blocks described in one or more processes of the flowcharts and/or one or more blocks of the block diagrams may be implemented by executing the instructions by the computer or the other processing apparatus having programmable data processing device.

Such computer program instructions may also be stored in a computer readable memory device which may cause a computer or another programmable data processing apparatus to function in a specific manner, so that a manufacture including an instruction apparatus may be built based on the instructions stored in the computer readable memory device. That instruction device implements functions indicated by one or more processes of the flowcharts and/or one or more blocks of the block diagrams.

The computer program instructions may also be loaded into a computer or another programmable data processing apparatus, so that a series of operations may be executed by the computer or the other data processing apparatus to generate computer implemented processing. Therefore, the instructions executed by the computer or the other programmable apparatus may be used to implement one or more processes of the flowcharts and/or one or more blocks of the block diagrams.

In a typical configuration, a computing device includes one or more processors (CPU), an input/output interface, a network interface and memory. The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Figure 4:
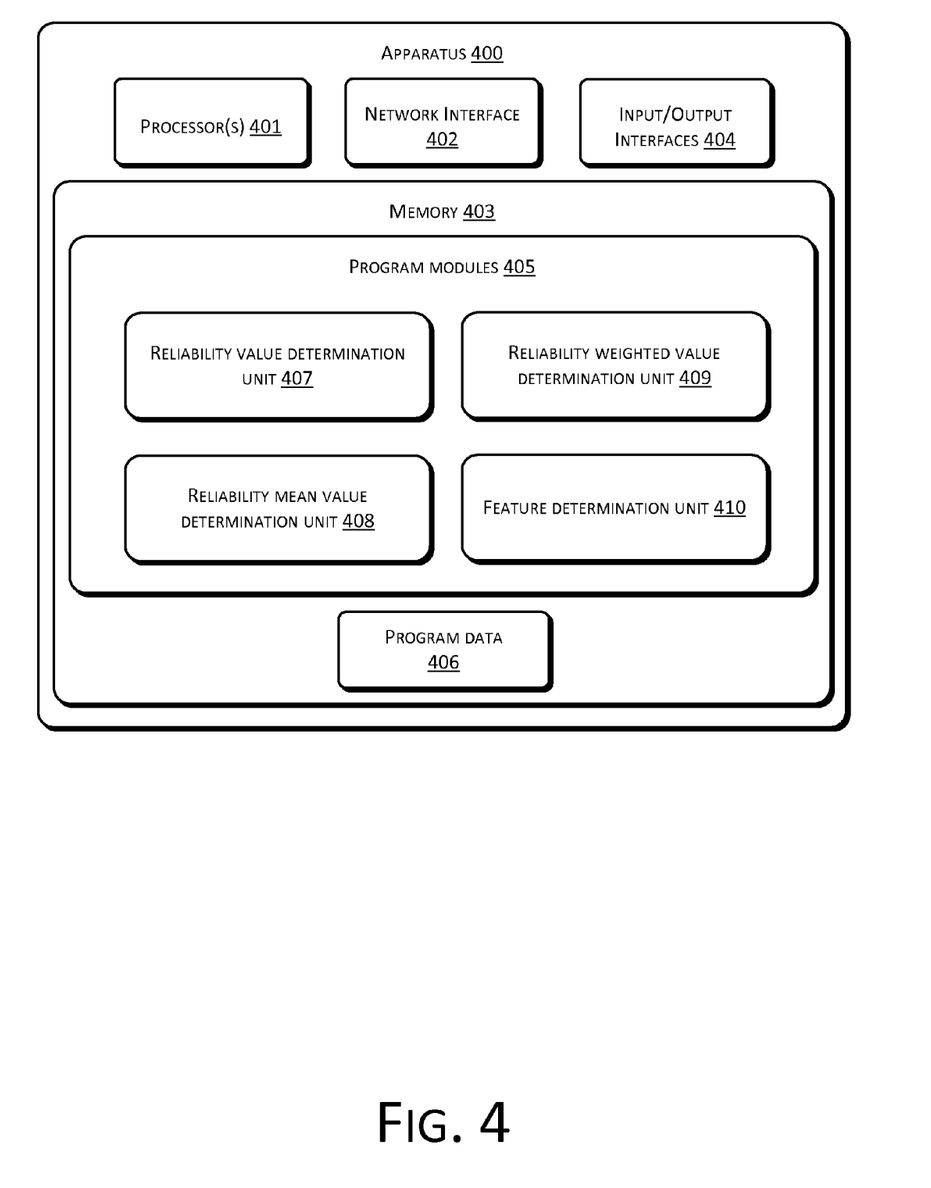
FIG. 4 is a structural diagram of the user feature identification apparatus described in FIG. 3 in further details.

FIG. 4 shows an example apparatus 400, such as the apparatus as described above, in more detail. In an embodiment, the apparatus 400 may include, but is not limited to, one or more processors 401, a network interface 402, memory 403 and an input/output interface 404.

The memory 403 may include a form of computer readable media, e.g., a non-permanent storage device, random-access memory (RAM) and/or a nonvolatile internal storage, such as read-only memory (ROM) or flash RAM. The memory 403 is an example of computer readable media.

The memory 403 may include program units 405 and program data 406. In one embodiment, the program units 405 may include a reliability value determination unit 407, a reliability mean value determination unit 408, a reliability weighted value determination unit 409 and a feature determination unit 410. Details of these units may be found in the foregoing description and are not redundantly described herein.

One skilled in the art may make changes and modifications of the present disclosure without departing from the spirit and scope of the present disclosure. If these changes and modifications are within the scope of the claims and their equivalents of the present disclosure, the present disclosure intends to covers such changes and modifications.

What is claimed is:

1. A method performed by a computer, the method comprising:
    determining a reliability value of an online designated evaluation of an interacting party based on a feature value of an online service interaction in response to receiving the online designated evaluation of the interacting party in the online service interaction;
    determining a reliability mean value of multiple designated evaluations based on reliability values of the multiple designated evaluations of the interacting party in multiple online service interactions including the online designated evaluation;
    determining a reliability weighted mean value of the multiple designated evaluations based on a frequency weight corresponding to the multiple designated evaluations and the reliability mean value, wherein a number of the multiple designated evaluations is in a monotonically incremental or decremental relationship with the frequency weight;
    determining a user feature of the interacting party based on a size relationship between the reliability weighted mean value and a preset reliability threshold; and
    hiding the online designated evaluation from the interacting party if the interacting party is a providing party of the online service interaction and the online designated evaluation is a negative evaluation.

2. The method of claim 1, wherein determining the reliability value of the online designated evaluation of the interacting party based on the feature value of the online service interaction, comprises obtaining the reliability value of the online designated evaluation of the interacting party by calculating a weighted sum of feature values of the online service interaction in multiple dimensions and dimension weights corresponding to the multiple dimensions.

3. The method of claim 1, wherein determining the reliability mean value of the multiple designated evaluations based on the reliability value of the online designated evaluation, comprises one or more of:
   setting an arithmetic mean value of the reliability values of the multiple designated evaluations as the reliability mean value of the multiple designated evaluations;
   obtaining the reliability mean value of the multiple designated evaluations by performing a weighted summation of the reliability values of the multiple designated evaluations and reliability weights corresponding to the multiple designated evaluations; and
   determining the reliability mean value of the multiple designated evaluations using the following formula:

$$\overline{X}_n = \overline{X}_{n-1}*\beta + X_n*(1-\beta);$$

wherein $\overline{X}_n$ is the reliability mean value of the multiple designated evaluations, $\overline{X}_{n-1}$ is a reliability mean value of designated evaluations in the multiple designated evaluations other than the designated evaluation, $X_n$ is the reliability value of the online designated evaluation, $\beta$ is a constant greater than zero and less than one, and n is the number of the multiple designated evaluations.

4. The method of claim 1, wherein the interacting party comprises a providing party or a receiving party of the online service interaction, and the online designated evaluation comprises a negative evaluation or a positive evaluation.

5. The method of claim 1, wherein determining the user feature of the interacting party based on the size relationship between the reliability weighted mean value and the preset reliability threshold, comprises:
   if the interacting party is a providing party and the online designated evaluation is a negative evaluation, determining that the user feature of the interacting party is a negative feature and triggering a warning when the reliability weighted mean value is greater than the preset reliability threshold, wherein the number of the multiple designated evaluations is in the monotonically incremental relationship with the frequency weight; or
   if the interacting party is the providing party and the online designated evaluation is a positive evaluation, determining that the user feature of the interacting party is a positive feature when the reliability weighted mean value is greater than the preset reliability threshold, wherein the number of the multiple designated evaluations is in the monotonically incremental relationship with the frequency weight.

6. The method of claim 1, wherein determining the user feature of the interacting party based on the size relationship between the reliability weighted mean value and the preset reliability threshold, comprises:
   if the interacting party is a receiving party and the online designated evaluation is a negative evaluation, determining that the user feature of the interacting party is a fake feature and triggering a warning when the reliability weighted mean value is less than the preset reliability threshold, wherein the number of the multiple designated evaluations is in the monotonically decremental relationship with the frequency weight.

7. The method of claim 1, wherein a reliability weighted mean value of multiple negative evaluations is a product of the frequency weight and the reliability mean value.

8. An apparatus comprising:
   one or more processors;
   memory storing units executable by the one or more processors, the units comprising:
   a reliability value determination unit configured to, in response to receiving a designated evaluation of an interacting party in a service interaction, determine a reliability value of the designated evaluation of the interacting party based on a feature value of the service interaction;
   a reliability mean value determination unit configured to determine, based on the reliability value of the designated evaluation, a reliability mean value of multiple designated evaluations of the interacting party in multiple service interactions including the designated evaluation;
   a reliability weighted mean value determination unit configured to determine a reliability weighted mean value of the multiple designated evaluations based on a frequency weight corresponding to the multiple designated evaluations and the reliability mean value, wherein a number of the multiple designated evaluations is in a monotonically incremental or decremental relationship with the frequency weight; and
   a feature determination unit configured to determine a user feature of the interacting party according to a size relationship between the reliability weighted mean value and a preset reliability threshold,
   wherein the designated evaluation of the interacting party is invisible to the interacting party if the interacting party is a providing of the service interaction and the designated evaluation is a negative evaluation.

9. The apparatus of claim 8, wherein the reliability value determination unit is further configured to obtain the reliability value of the designated evaluation of the interacting party by calculating a weighted sum of feature values of the service interaction in multiple dimensions and dimension weights corresponding to the multiple dimensions.

10. The apparatus of claim 8, wherein the reliability mean value determination unit is further configured to:
   set an arithmetic mean value of the reliability values of the multiple designated evaluations as the reliability mean value of the multiple designated evaluations;
   obtain the reliability mean value of the multiple designated evaluations by performing a weighted summation of the reliability values of the multiple designated evaluations and reliability weights corresponding to the multiple designated evaluations; and/or
   determine the reliability mean value of the multiple designated evaluations using the following formula:

$$\overline{X}_n = \overline{X}_{n-1}*\beta + X_n*(1-\beta);$$

wherein $\overline{X}_n$ is the reliability mean value of the multiple designated evaluations, $\overline{X}_{n-1}$ is a reliability mean value of designated evaluations in the multiple designated evaluations other than the designated evaluation, $X_n$ is the reliability value of the designated evaluation, $\beta$ is a constant greater than zero and less than one, and n is the number of the multiple designated evaluations.

11. The apparatus of claim 8, wherein the feature determination unit is further configured to:
   if the interacting party is a providing party and the designated evaluation is a negative evaluation, determine that the user feature of the interacting party is a negative feature and trigger a warning when the reliability weighted mean value is greater than the preset reliability threshold, wherein the number of the multiple designated evaluations is in the monotonically incremental relationship with the frequency weight; or
   if the interacting party is the providing party and the designated evaluation is a positive evaluation, determine that the user feature of the interacting party is a positive feature when the reliability weighted mean value is greater than the preset reliability threshold, wherein the number of the multiple designated evaluations is in the monotonically incremental relationship with the frequency weight.

12. The apparatus of claim 8, wherein the feature determination unit is further configured to:
if the interacting party is a receiving party and the designated evaluation is the negative evaluation, determine that the user feature of the interacting party is a fake feature and trigger a warning when the reliability weighted mean value is less than the preset reliability threshold, wherein the number of the multiple designated evaluations is in the monotonically decremental relationship with the frequency weight.

13. The apparatus of claim 8, wherein the interacting party comprises a providing party or a receiving party of the service interaction, and the designated evaluation comprises a negative evaluation or a positive evaluation.

14. One or more computer-readable media storing executable instructions that, when executed by one or more processors, cause the one or more processors to perform acts comprising:
in response to receiving a designated evaluation of an interacting party in a service interaction, determining a reliability value of the designated evaluation of the interacting party based on a feature value of the service interaction;
based on reliability values of multiple designated evaluations of the interacting party in multiple service interactions including the designated evaluation, determining a reliability mean value of the multiple designated evaluations;
determining a reliability weighted mean value of the multiple designated evaluations based on a frequency weight corresponding to the multiple designated evaluations and the reliability mean value, wherein a number of the multiple designated evaluations is in a monotonically incremental or decremental relationship with the frequency weight;
determining a user feature of the interacting party based on a size relationship between the reliability weighted mean value and a preset reliability threshold; and
hiding the designated evaluation of the interacting party from the interacting party if when the interacting party is a providing party and the designated evaluation is a negative evaluation.

15. The one or more computer-readable media of claim 14, wherein determining the reliability value of the designated evaluation of the interacting party based on the feature value of the service interaction, comprises obtaining the reliability value of the designated evaluation of the interacting party by calculating a weighted sum of feature values of the service interaction in multiple dimensions and dimension weights corresponding to the multiple dimensions.

16. The one or more computer-readable media of claim 14, wherein determining the reliability mean value of the multiple designated evaluations based on the reliability value of the designated evaluation, comprises one or more of:

setting an arithmetic mean value of the reliability values of the multiple designated evaluations as the reliability mean value of the multiple designated evaluations;
obtaining the reliability mean value of the multiple designated evaluations by performing a weighted summation of the reliability values of the multiple designated evaluations and reliability weights corresponding to the multiple designated evaluations;
and determining the reliability mean value of the multiple designated evaluations using the following formula:

$$\overline{X}_n = \overline{X}_{n-1} * \beta + X_n * (1-\beta);$$

wherein $\overline{X}_n$ is the reliability mean value of the multiple designated evaluations, $\overline{X}_{n-1}$ is a reliability mean value of designated evaluations in the multiple designated evaluations other than the designated evaluation, $X_n$ is the reliability value of the designated evaluation, $\beta$ is a constant greater than zero and less than one, and n is the number of the multiple designated evaluations.

17. The one or more computer-readable media of claim 14, wherein the interacting party comprises a providing party or a receiving party of the service interaction, and the designated evaluation comprises a negative evaluation or a positive evaluation.

18. The one or more computer-readable media of claim 14, wherein determining the user feature of the interacting party based on the size relationship between the reliability weighted mean value and the preset reliability threshold, comprises:
if the interacting party is a providing party and the designated evaluation is a negative evaluation, determining that the user feature of the interacting party is a negative feature and triggering a warning when the reliability weighted mean value is greater than the preset reliability threshold, wherein the number of the multiple designated evaluations is in the monotonically incremental relationship with the frequency weight; or
if the interacting party is the providing party and the designated evaluation is a positive evaluation, determining that the user feature of the interacting party is a positive feature when the reliability weighted mean value is greater than the preset reliability threshold, wherein the number of the multiple designated evaluations is in the monotonically incremental relationship with the frequency weight.

19. The one or more computer-readable media of claim 14, wherein determining the user feature of the interacting party based on the size relationship between the reliability weighted mean value and the preset reliability threshold, comprises:
if the interacting party is a receiving party and the designated evaluation is a negative evaluation, determining that the user feature of the interacting party is a fake feature and triggering a warning when the reliability weighted mean value is less than the preset reliability threshold, wherein the number of the multiple designated evaluations is in the monotonically decremental relationship with the frequency weight.

20. The one or more computer-readable media of claim 14, wherein a reliability weighted mean value of multiple negative evaluations is a product of the frequency weight and the reliability mean value.

* * * * *